Figure 1:
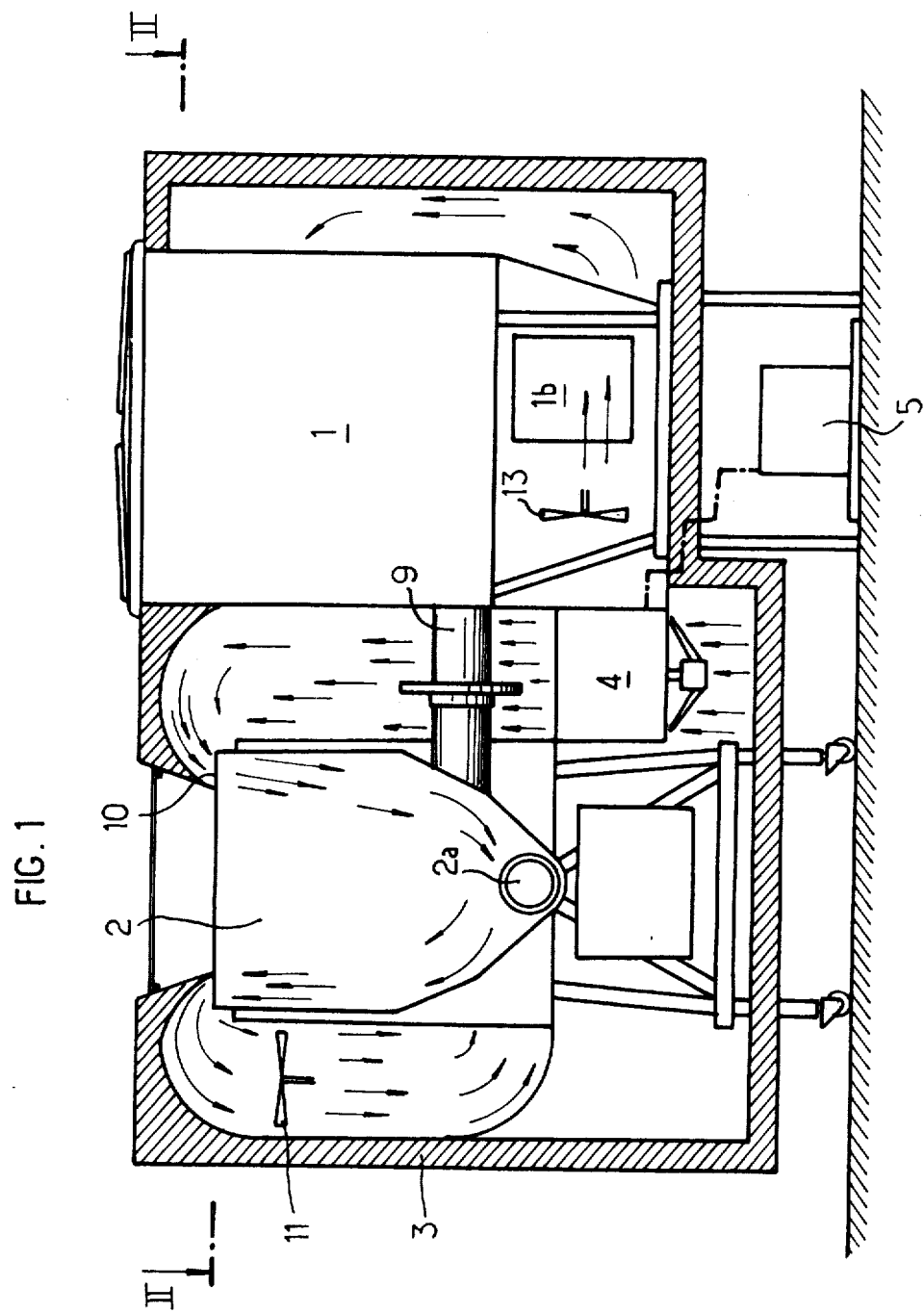

United States Patent [19]

Fradin

[11] 3,975,548

[45] Aug. 17, 1976

[54] PULVERISING PROCESS FOR THE PRODUCTION OF FROZEN MINCED MEAT

[75] Inventor: Maurice Fradin, St Jean De Monts, France

[73] Assignee: Agence Nationale de Valorisation de la Recherche (ANVAR), France

[22] Filed: Jan. 31, 1975

[21] Appl. No.: 545,956

Related U.S. Application Data

[62] Division of Ser. No. 312,563, Dec. 6, 1972, abandoned.

[30] Foreign Application Priority Data

Dec. 8, 1972 France .................. 72.44018

[52] U.S. Cl. .................. 426/513; 62/320; 241/16; 241/48; 426/518; 426/519
[51] Int. Cl.² .................. A22C 5/00; A22C 7/00
[58] Field of Search .......... 426/518, 513, 519, 444, 426/646, 641, 524, 327, 418; 62/320, 93; 241/16, 65, 48, 47, 57; 99/467, 473, 474, 475

[56] References Cited
UNITED STATES PATENTS

| | | | |
|---|---|---|---|
| 2,526,498 | 10/1950 | Pacciano | 62/320 X |
| 2,665,724 | 1/1954 | Lundell | 241/65 |
| 2,792,042 | 5/1957 | Dwyer et al. | 241/65 |
| 2,836,368 | 5/1958 | McCoy | 426/518 X |
| 2,836,825 | 5/1958 | Schnell | 426/518 |
| 2,852,395 | 9/1958 | Gaumer | 426/518 X |
| 3,253,931 | 5/1966 | Coleman et al. | 426/646 X |
| 3,492,831 | 2/1970 | Maurer et al. | 62/93 X |
| 3,771,729 | 11/1973 | Frable | 241/65 |
| 3,857,254 | 12/1974 | Lobel | 62/93 X |
| 3,865,180 | 2/1975 | McKenney et al. | 62/93 X |
| 3,881,032 | 4/1975 | Matsumoto et al. | 426/327 X |

Primary Examiner—Robert L. Lindsay, Jr.
Assistant Examiner—Kenneth M. Schor
Attorney, Agent, or Firm—William A. Drucker

[57] ABSTRACT

In a pulverising equipment for the production of frozen minced meat, essentially consisting of a pulveriser followed by a malaxator, there is provided means for causing the passage, across the pulverised meat, while it is being stirred in the malaxator, of refrigerated air from which the water vapor has been extracted by condensation. The refrigerated air picks up moisture from the meat, and the moisture (in the form of water vapor) is later condensed out at freezing temperatures as low as -10 to -20 degrees centigrade. This eliminates most of the pathogenic germs from the final product.

3 Claims, 2 Drawing Figures

PULVERIZING PROCESS FOR THE PRODUCTION OF FROZEN MINCED MEAT

This is a division of application Ser. No. 312,563, filed Dec. 6, 1972 and now abandoned.

The invention concerns the production of frozen minced meat, and in particular beefsteak.

A device for low-temperature tunnel freezing of food-stuffs, is priorly known, and essentially consists of a refrigerating jacket in the form of a tunnel for the low-temperature freezing, in successive batches, of food-stuffs, including a system of low-temperature refrigerating tunnel being located between a pulverising assembly and a packaging machine. The pulverising assembly normally consists of a first pulveriser, followed by a malaxator which feeds the meat into a finishing and shaping machine.

It is obviously essential, in this type of installation, that the meat produced contains no pathogenic germs whatever. As the pulverising and malaxating operations generate a certain amount of heat, it has been suggested, with a view to preventing the development of germs in the pulverising assembly, that the active components thereof be chilled.

The conventional solution, which consists of adding ice to the meat to be pulverised, is by no means satisfactory because of the absorption by the meat of a relatively significant quantity of water (5 to 8% for example).

It has been priorly proposed that the active components of the pulveriser be chilled either by means of a coil containing a refrigerating liquid or by circulating nitrogen at a low temperature (−10° C, for example). These latter solutions have already led to better results than the conventional solution.

It is an object of the present invention to provide a considerable improvement in the production of frozen minced meat, particularly as far as the pathogenic germs content therein is concerned.

To this end, it envisages that the malaxating stage should take place in air cooled to a temperature of the order of −10° to −20° C, from which germs have been eliminated by condensation of the water vapour contained therein, this air being stirred at the same time as the meat, as it passes the grille around which it circulates.

The invention will be better understood with the help of the description below.

Figure 2:
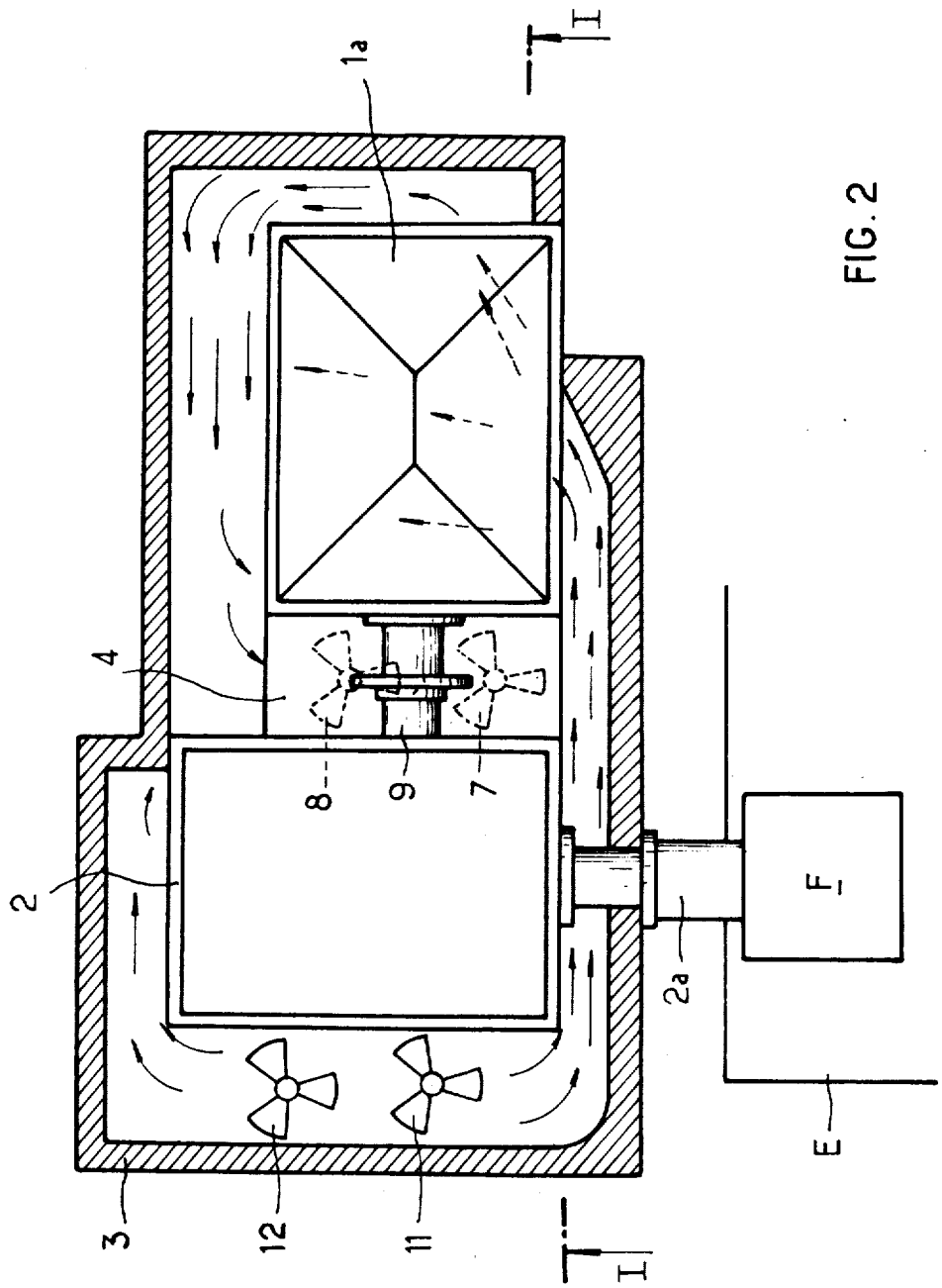

In the attached drawings:

FIG. 1 is a diagrammatic view from the front, with a part section through I—I of FIG. 2, of a pulveriser assembly adapted for the purpose of the invention, which is shown diagrammatically in FIG. 2 a plan view with a part section through II—II of FIG. 1.

It will be seen that the assembly described consists of a pulveriser and a malaxator 2 accomodated in a closed insulating jacket 3. The only open part is the hopper 1a for inserting the meat in the pulveriser 1 and the outlet from the malaxator via the pulveriser screw 2a contained therein. In fact, the hopper 1a terminates in the pulveriser screw, which as good as prevents the entry of any air from the outside, while the outlet 2a is connected to the above-mentioned low-temperature refrigerating jacket. This latter, which does not constitute a part of the invention, has merely been sketched in at E and contains, for example, a finishing and shaping device F.

The pulveriser 1 (driven by a motor 1b) minces the meat to a coarse stage, while the mixer 2 causes it to be stirred (for this purpose, it has vanes or other moving parts, not illustrated, located inside the closed container 2), this process being followed by further pulverisation by the screw 2a. This stirring ensures a relatively homogeneous distribution of the fat and lean parts.

In the apparatus presently being described, cooling of the assembly is achieved by means of cold(−20° C, for example) purified air which flows in an almost closed circuit inside the insulating jacket, as shown by arrows in the drawing. This air is cooled and purified by causing it to pass through a cold-producing bank 4 which at the same time acts as a condenser for the water vapour contained therein. This bank 4 can, for example, be of a type which consists of an exchanger with fins connected by a pipe in which a cooling liquid flows. At 5 (FIG. 1) is shown a device which supplies the cooling liquid. The air, which is drawn into the exchanger inlet by fans 7, 8, passes around the pipe 9 which feeds the meat from the pulveriser 1 to the malaxator 2, and then enters the malaxating vessel via an opening 10 formed in the upper wall of the latter. After circulating around the meat being stirred, it is drawn by the fans 11, 12, passes along the housing of the screw 2a and returns to the exchanger. In addition, the air is drawn by a fan 13 towards the pulveriser 1, and circulates around it.

The pulveriser 1, and also the pulveriser screw 1a of the malaxator, are thus cooled by thermal conduction.

In addition, the meat being malaxated is in permament contact with the air purified by the exchanger. This purification consists basically of condensation of the water vapour, and is continuously effected by contact of the air with the minced meat. The water content of the final product is thus as small as possible.

Thanks to his process, the applicant has been able to arrive at a final product containing no pathogenic germs, such as coliform or salmonella germs, and a total number of germs not exceeding a few thousands per gram. This result is particularly surprising, when it is recalled that minced meat obtained by current procedures contains several hundred thousand germs per gram.

The explanation probably lies in a phenomenon of fixation of the germs at the level of the water vapour which condenses on the exchanger.

Of couse, the latter is carefully washed every day, the equipment being fitted for this purpose with doors (not shown).

I claim:

1. The method of producing sanitized frozen minced meat which comprises the steps of:
   a. pulverising meat in a first vessel;
   b. passing the pulverised meat into a second vessel which is substantially closed and mixing the meat therein;
   c. forcing air over a heat exchanger for cooling the air to a temperature below freezing and thus removing the water vapor therefrom by condensation;
   d. forcing the cooled dry air through the meat while being mixed within the second vessel and back over the heat exchanger in a substantially closed air circuit to condense the water vapor and germs adhered thereto by contact with the meat;
   e. continuously practicing the last step while the meat is being mixed; and f. forcing the cooled air about the first vessel for cooling the meat therein while being pulverised by conduction through the walls of said first vessel.

2. The method of claim 1 wherein the air is cooled to a temperature of the order of −10° to −20°C.

3. The method of claim 1 including the additional steps of further pulverising the mixed meat and shaping it.

* * * * *